United States Patent [19]

Baumgarten

[11] Patent Number: 5,480,227
[45] Date of Patent: Jan. 2, 1996

[54] SCREW EXTRUDER WITH SHEAR-CONTROLLING DIAGONALLY EXTENDING PINS

[75] Inventor: Wilfried Baumgarten, Pattensen, Germany

[73] Assignee: Krupp Maschinentechnik GmbH, Essen, Germany

[21] Appl. No.: 284,554

[22] PCT Filed: Dec. 11, 1993

[86] PCT No.: PCT/EP93/03507

§ 371 Date: Aug. 9, 1994

§ 102(e) Date: Aug. 9, 1994

[87] PCT Pub. No.: WO94/14597

PCT Pub. Date: Jul. 7, 1994

[30] Foreign Application Priority Data

Dec. 28, 1992 [DE]  Germany ............ 42 44 312.1

[51] Int. Cl.⁶ ..................................... B29B 7/42
[52] U.S. Cl. ............... 366/80; 366/90; 366/307; 366/322
[58] Field of Search ................ 366/69, 75, 76, 366/80, 90, 302, 303, 304, 307, 322; 425/200, 203, 208

[56] References Cited

U.S. PATENT DOCUMENTS

| | | | |
|---|---|---|---|
| 3,169,752 | 2/1965 | Laubarede | 366/80 |
| 3,482,822 | 12/1969 | Krizak et al. | 366/303 X |
| 4,007,545 | 2/1977 | Briggs . | |
| 4,347,003 | 8/1982 | Anders | 366/75 |
| 4,504,150 | 3/1985 | De Vries | 366/80 |
| 4,538,917 | 9/1985 | Harms | 366/80 X |
| 4,629,326 | 12/1986 | Huls | 366/80 |
| 4,629,327 | 12/1986 | Capelle | 366/80 |
| 4,657,499 | 4/1987 | Lewellen et al. | 366/90 X |
| 4,723,901 | 2/1988 | Sarumaru | 425/208 |
| 4,960,328 | 10/1990 | Schumacher et al. | 366/80 |
| 5,190,771 | 3/1993 | Baumgarten | 366/80 X |
| 5,324,108 | 6/1994 | Baumgarten | 366/75 X |
| 5,362,146 | 11/1994 | Nogossek | 366/307 X |

FOREIGN PATENT DOCUMENTS

| | | | |
|---|---|---|---|
| 0116773 | 8/1984 | European Pat. Off. . | |
| 0490362A1 | 6/1992 | European Pat. Off. . | |
| 1454801 | 9/1972 | Germany | 366/80 |
| 2235784C3 | 1/1974 | Germany . | |
| 2731438C2 | 1/1978 | Germany . | |
| 2731301C2 | 1/1978 | Germany . | |
| 3503911C1 | 9/1986 | Germany . | |
| 3613612C3 | 11/1986 | Germany . | |
| 3613584 | 11/1986 | Germany | 366/80 |
| 3534097 | 4/1987 | Germany | 366/80 |
| 3805849 | 9/1989 | Germany | 366/80 |
| 4012612C2 | 10/1991 | Germany . | |
| 4010540C1 | 11/1991 | Germany . | |
| 4039942C1 | 1/1992 | Germany . | |
| 1184555 | 10/1987 | Italy | 366/80 |
| 889477 | 12/1981 | U.S.S.R. | 366/80 |
| 2068249 | 8/1981 | United Kingdom . | |
| WO91/15348 | 10/1991 | WIPO . | |

*Primary Examiner*—Charles E. Cooley
*Attorney, Agent, or Firm*—Herbert Dubno

[57] ABSTRACT

A screw-type extruder in which the wall of the cylinder receiving the screw has an annular recess which is disposed in a radial region of a core bead of the screw and pins extend through this recess and are diagonally inclined to the radial plane thereof close to the circumference of the bead.

12 Claims, 5 Drawing Sheets

SCREW EXTRUDER WITH SHEAR-CONTROLLING DIAGONALLY EXTENDING PINS

CROSS REFERENCE TO RELATED APPLICATIONS

This application is a national phase of PCT/EP93/03507 filed 11, Dec. 1993, and based, in turn, upon German national application P42 44 312.1 filed 28 Dec. 1992 under the International Convention.

FIELD OF THE INVENTION

The invention relates to a screw-type extruder in whose cylinder, receiving at least one endless screw, bores are provided for receiving pins arranged in radial planes, projecting into the conveying area, the axes of the pins being arranged tangentially to the cylinder wall or close to the tangents and parallel thereto.

BACKGROUND OF THE INVENTION

A screw-type extruder of this kind has become known from DE 40 10 540 C1.

Screw-type extruders serve for plastifying and homogenization of the mass to be extruded, a process involving strong heating and depending on the nature of the mass. In the case of cross-linkable/vulcanizable masses this heating limits the throughput rate of the extruder, since cross-linking and/or vulcanization are not allowed to occur in the extruder. Among the technical means achieving the required plastification with a minimum heating of the mass, in practice two principles have been found to be particularly effective, namely the so called transfer mix according to DE 27 31 301 A1/DE 27 31 438 A1 and the pin extruder with radial pins according to DE 22 35 784 B2 and others. Radial pins with an active conveying or mixing action, e.g. according to DE 36 13 612 A1 are substantially more sensitive from the mechanical point of view than simple radial pins and have therefore not been introduced in practice.

However besides the natural wear, the biggest disadvantage of pins radially projecting into the cylinder is that the pins even when new, but especially after a certain wear, are subject to breakage. Such pin breakages are costly, since they do not only damage the machine but also create product problems because they cannot be covered by the product liability insurance of the manufacturers and result in rejects or high control costs.

The extruder according to DE 40 39 942 C1 which is supposed to combine the advantages of the transfer mix and of the radial-pin extruder has also the same problems and in addition is also very expensive.

The tangential-pin extruder according to DE 40 10 540 C1 avoids the breaking danger due to the different, namely, tangential arrangement of the pins, lowers the manufacturing costs compared with the transfer mix and allows for an intensive tempering of the pins, which makes possible a higher rotational speed of the screw and thereby higher throughput rates of the extruder. These pins, however, also do not have an active conveying effect. A disadvantage similar to the radial-pin extruders is that self-cleaning does not occur without problems. The insertion and removal of the conveyor screw is possible only when the pins have been pulled out from the inner cylinder space.

OBJECTS OF THE INVENTION

It is an object of the invention avoids the disadvantages of the state of the art.

It is another object of the invention to provide a screw-type extruder with a high plastifying output which can be manufactured in a simple and cost-efficient manner, and which has the advantage of improved self-cleaning conditions and is fully secured against pin breakage.

SUMMARY OF THE INVENTION

The invention consists in that the pins are arranged in areas where the screw is provided with a core bead and the cylinder is provided with an annular recess in its inner wall. The pins are arranged outside a (theoretical) cylinder enveloping the backs of the screw webs. The pins traverse diagonally the radial plane area in which the ring bead and the annular recess are located.

This screw-type extruder can be manufactured in a simple way because the production of annular recesses in the cylinder and ring beads on the screw does not create problems and is cost-efficient. The pins are located in slanted bores of the cylinder of the screw-type extruder, their production requiring considerable less expense than the production of a transfer mix thread in the inner wall of the cylinder, which can be produced only by complicated milling processes, while in the case of the screw-type extruder of the invention merely drilling processes are required for producing the bores which receive the pins. The inclined position of the pins leads on the one hand to the fact that a self-cleaning takes place at the end of an operational phase. A high plastifying effect occurs due to the fact that the material processed in the extruder is rearranged from the screw windings to the cylinder recesses where it is subjected to a particularly intensive plastifying treatment by the pins. Consequently a good conveying effect in the axial direction results. It is possible to mount and dismount the screw without removing the pins. Pin breakages can not occur, since the tangential pins are restrained and fastened on both sides. The plastifying and conveying effect is similar to the transfer mix, but the manufacture of the apparatus is considerably less expensive.

From the construction point of view this extruder can be simply produced and built by imparting a trapezoidal shaped cross section to the annular recess in the cylinder wall; the bead on the screw core can also have a trapezoidal cross section.

The inclined orientation of the pins is suitably set so that the pin axes and radial plane include between them an angle of at least 30° to maximum of approximately 75°.

These pins also create an excellent opportunity to cool very efficiently the masses in the extruder precisely in the area where they heated the most, when the pins are hollow and are traversed by a heat-transfer medium.

The pins can have a recess whose radius is larger than the radius of the screw. This allows for a particularly intensive processing of the mass to be extruded, since the passage area of the larger cross section is smaller than in the case of simple pins with circular cross section. This design also allows for a setting of the plastifying effect, when the pins can be adjusted and fastened about their axis at a certain angle, e.g. approximately 45° or 60°.

It is advantageous when the distance between the pins in the radial plane area corresponds approximately to the pin diameter or is narrower than the pin diameter. Due to the inclined position of the pins it is possible to lodge considerably more pins in one radial plane area than is possible according to DE 40 10 540 C1. By selecting the distance between the pins the plastifying effect can be set to certain desired values. It is even possible to eliminate some of the pins when the plastification of masses to be processed presents few problems, and to insert instead in the pin receiving holes sealing bolts which extend up to the annular recess in the inner cylinder wall, but do not project into the annular recess. For masses which are particularly difficult to break up it can be suitable to provide the core bead of the screw with teeth which exert a shearing and cutting action on rough parts of the mass to be extruded.

Thereby it can be advantageous when the depth of the toothing decreases in conveying direction.

In the cases of masses which are hard to break up it can also be of advantage to arrange the in several radial plane areas in succession.

BRIEF DESCRIPTION OF THE DRAWING

The above and other objects, features, and advantages will become more readily apparent from the following description, reference being made to the accompanying drawings in which.

SPECIFIC DESCRIPTION

Figure 2:
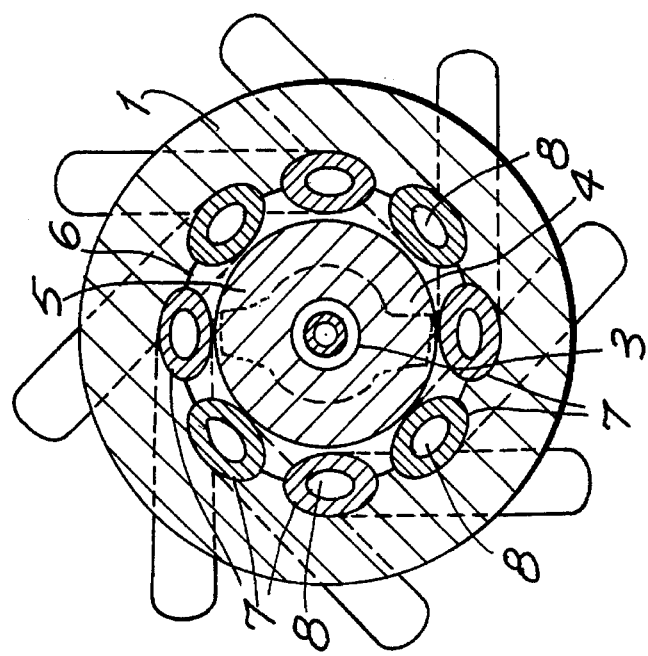
FIG. 2 is a section along line II—II of FIG. 1.

In a cylinder 1 with tempering chambers 2 a rotating extruder screw 3 is arranged, having webs 4 of a screw flight and at least one core bead 5, which thickens completely or at least approximately up to the diameter of the screw. In the area of this core bead 5 the cylinder 1 has an annular recess 6 provided on the oncoming and on the discharge side, creating the space for cylindrical tangential pins 7, which can be tempered by a tempering medium flowing in the bores 8. The pins 7 are arranged with respect to the screw axis at angle β, (FIG. 6) so that their inner margins correspond precisely with the cylindrical section of the cylinder bore. Because of the angle the sections through the pins appear oval in the drawing.

Figure 1:
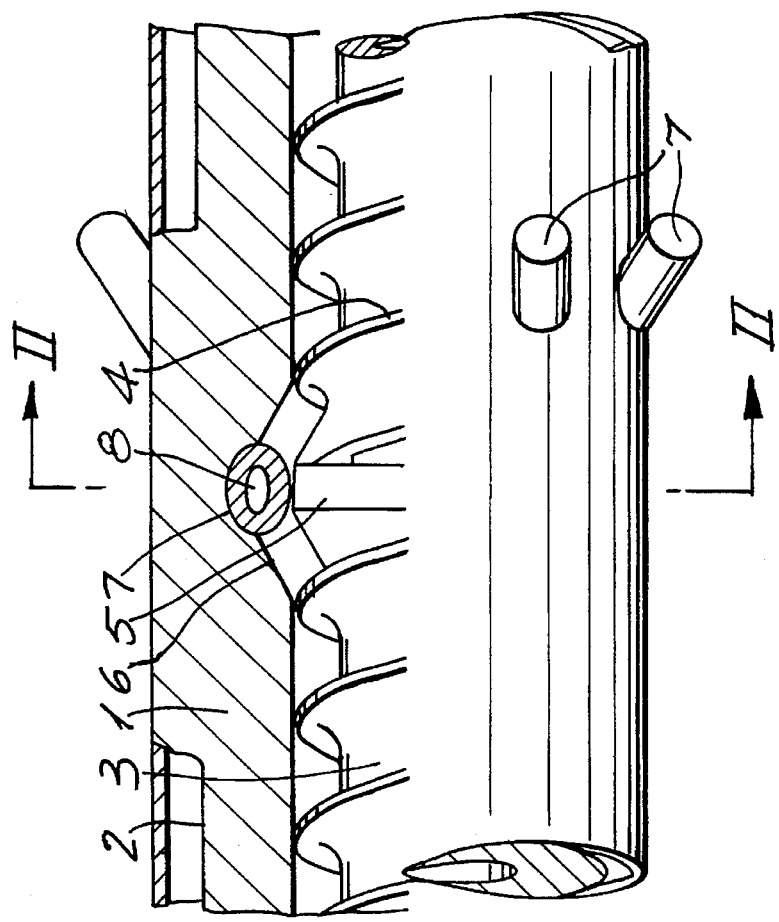
FIG. 1 is a partial longitudinal section of an extruder cylinder with diagonally arranged tangential pins.

In FIGS. 1 and 2 point-like locations of the narrowest distance are formed between the pins and the outer screw diameter. In the example eight pins are shown, however it is also possible to have any other number of pins per effective plane. In the area of the passages between the eight pins the mass to be extruded is strongly deformed, which means intensive shearing. Due to the cooperation between the rotating core bead or the screw slight and the diagonally arranged pins 7 a conveying effect results which also takes care of the emptying run at the end of charging.

An advantage of the diagonal arrangement is that, when compared with the tangential-pin extruder according to DE 40 10 54 C1, in a screw-bead plane (e.g. the sectional plane II—II) more pins can be arranged on the screw circumference, whereby the pins arranged in this area can deliver more plastifying energy (shearing work) to the mass to be extruded. Several such inclined pin zones 23, 24 can be arranged axially one after the other, when this seems necessary, see FIG. 8.

Figures 3, 4, 5:
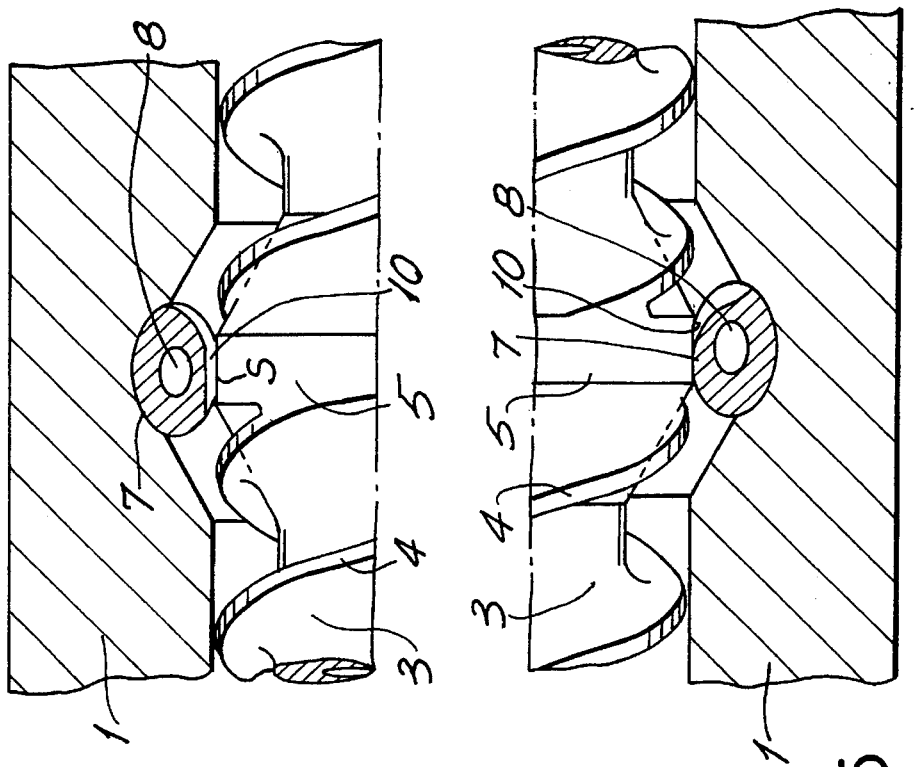
FIG. 3 is a transverse section of the assembly with tangential pins with a changeable gap width s.
FIG. 4 is a longitudinal section taken along line IV—IV of FIG. 3.
FIG. 5 is a longitudinal section with a minimal gap=½ of screw play and taken along line V—V of FIG. 3.

In FIGS. 3 to 5 the pins are brought somewhat closer to the outer screw diameter with their axes and/or inner margins, so that the pins have to be partially provided with recesses 10 for the rotating screw. As a consequence a place of smallest distance between the pin contour and the screw bead results, which leads to an even more intensive shearing of the extruded mass in this area.

The diagonally arranged tangential pins axially rotatable within a certain limit, whereby through rotation a partial recess in the pin can be utilized for adjustment of the gap widths between pin and outer screw diameter. In this way a stepless and continuously variable setting of the plastifying intensity (energy dissipation in the extruded material) can be achieved throughout the operation. Such a pin adjustment by rotating on the axis by e.g. 30° to maximum 90° is considerably cheaper from the construction point of view than the previously-described pin adjustment of radial pins. Moreover it is also technologically more effective. By turning the pins by an angle the higher degree of flattening can be achieved, thereby altering the width of gap "s".

The configuration of the pins can be seen in section in FIGS. 4 and 5. Their design is so that the gap width "s" can be adjusted according to the angular position from 0 to $s_{max}$. The setting device required for the adjustment of the angle position of the pins is not shown. In a modification of the construction it would also be possible to provide exchangeable or axially slidable pins, which would be just as successful.

With the aid of a sensor device (mass pressure measurement, temperature or viscosity measurement or the like) at the screw end or directly behind the pin zone, the pin setting can be automatically adjusted, whereby a particularly homogeneous, constantly good extruded material could be achieved.

Figure 6:
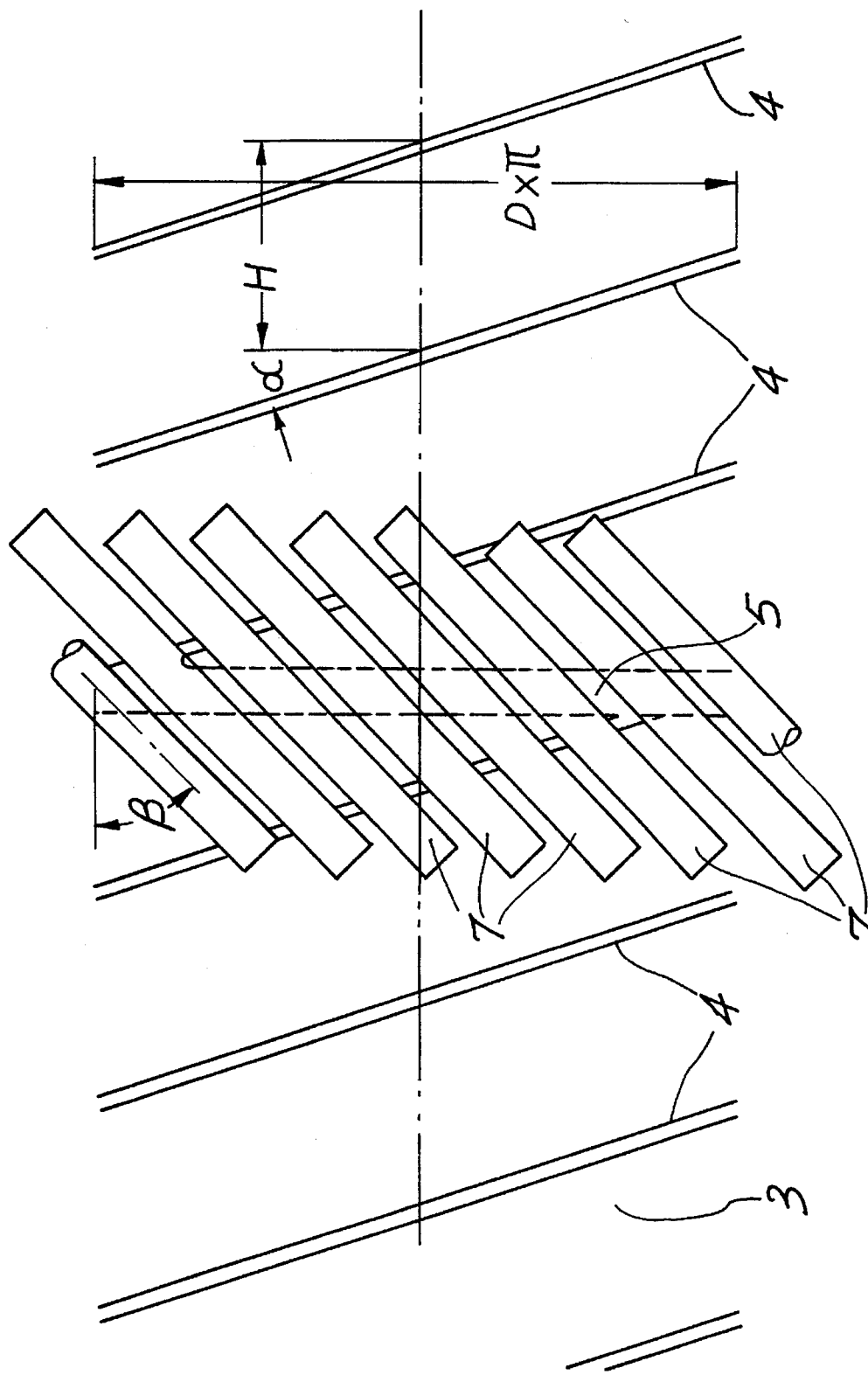
FIG. 6 is a developed view of the webs of a single-flight screw with a lead "H" and the diagonally arranged tangential pins.
Figure 7:
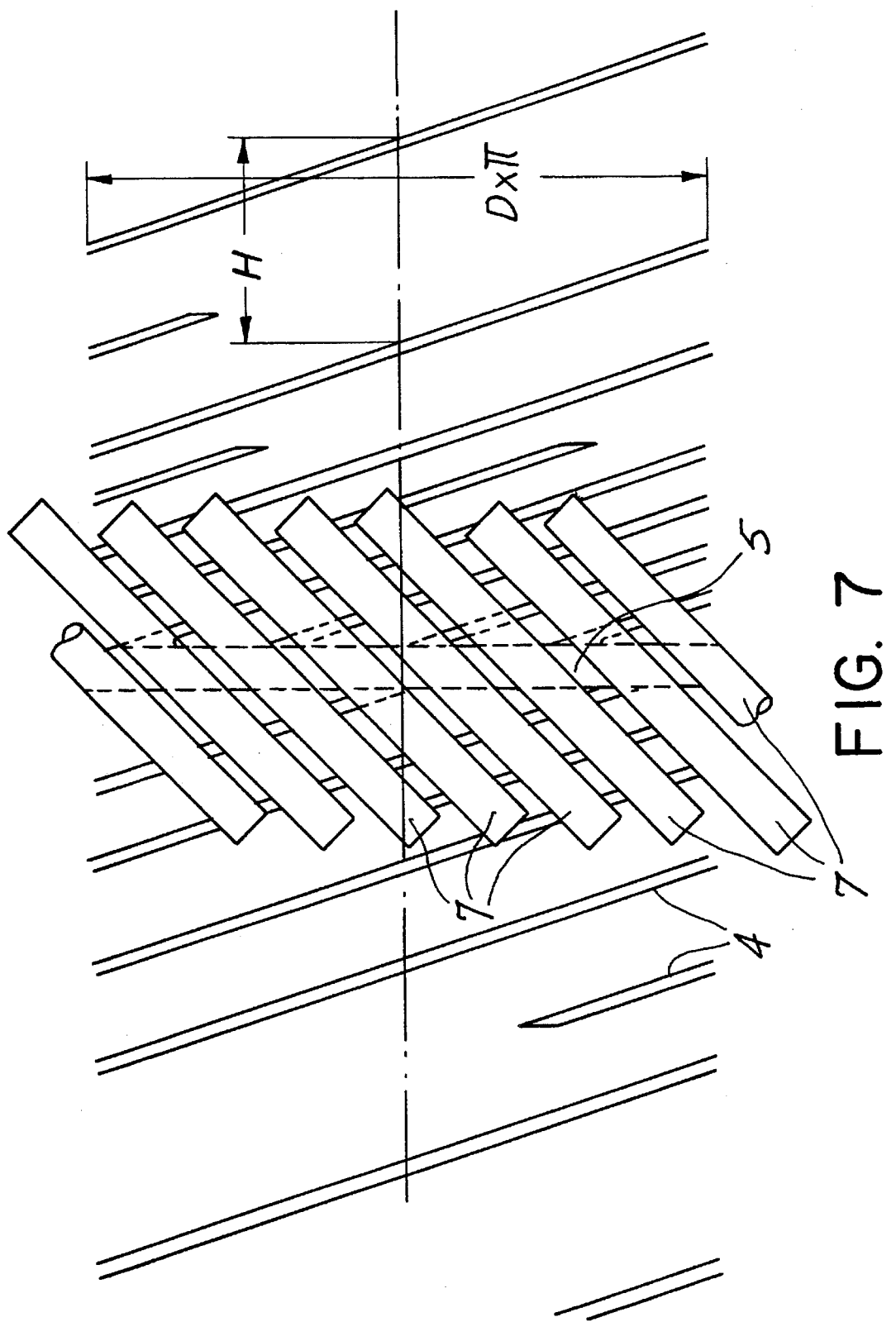
FIG. 7 is a developed view of the webs of a multi-flight screw in the pin area and of the diagonally arranged tangential pins.

In FIG. 6 shows a developed view of the screw windings in its subordination to the diagonally inserted pins. Thereby a single-flight screw with a lead H and a screw diameter D is represented. The screw could also be partially or totally multiple-flighted and/or having another lead (FIG. 7). The pin inclination angle β is shown at 45°. The number of the provided pins on the circumference depends on this angle. If for instance only six pins are selected for each effective zone, the angle β could be greater.

In FIG. 3 the pins provided diagonally to the screw axis are shown collapsed in the section plane. In FIGS. 4 and 5 the sections through the pins, which actually have at their surfaces a circular cross section, appear oval due to their inclined arrangement.

Figure 8:
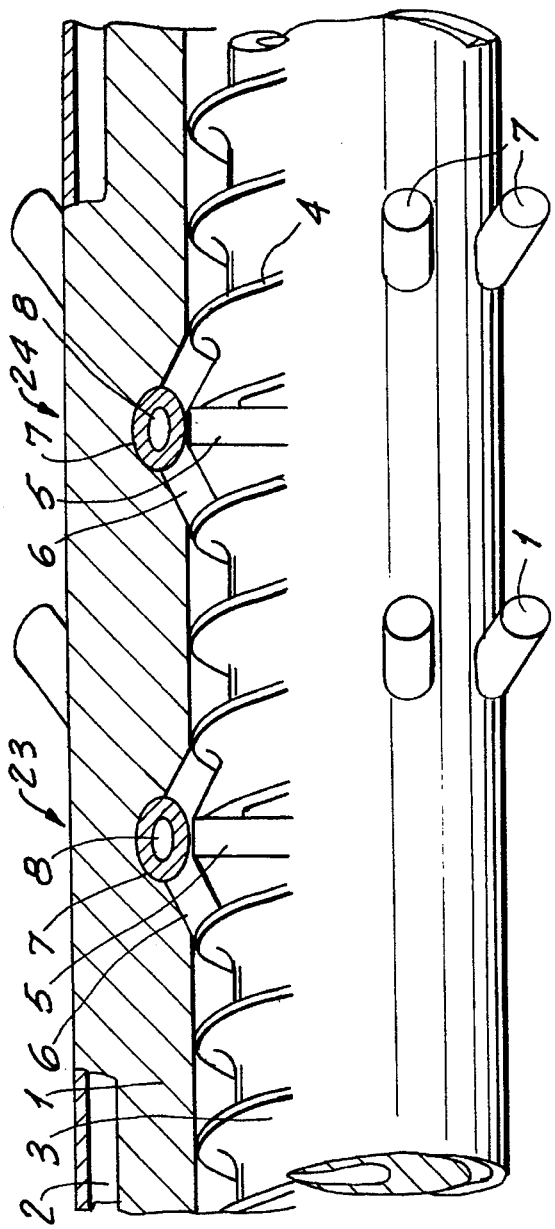
FIG. 8 is a partial longitudinal section similar to FIG. 1 but illustrating an embodiment in which the pins are arranged in several radial plane areas succeeding each other in the direction of flow.
Figure 9:
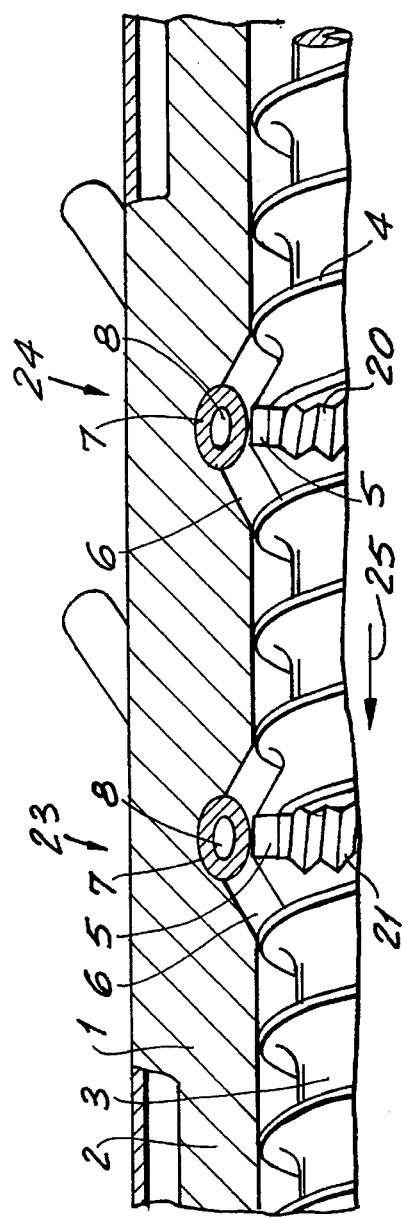
FIG. 9 is a partial longitudinal section of an embodiment in which the core bead of the screw is provided with toothing and the depth of the toothing decreases in the conveying direction.

FIG. 9 shows an embodiment similar to FIG. 8 but in which the core beads 5 have toothing 20 and 21 which decrease in depth in the conveying direction represented by the arrow 25.

I claim:

1. A screw extruder comprising:

an extruder cylinder having a cylinder bore;

at least one screw received in said bore and provided with a screw flight, and at least one annular core bead projecting outwardly to the diameter of said screw flight, said cylinder having an inner wall formed with an annular recess surrounding said bead; and a plurality of pins arranged in a radial zone of said at least one core bead and extending through said recess and juxtaposed with said at least one core bead, said pins being disposed externally of a cylindrical surface enveloping said flight and extending diagonally to a radial plane of said at least one core bead and said annular recess.

2. The screw extruder defined in claim 1 wherein said annular recess has a trapezoidal cross section.

3. The screw extruder defined in claim 1 wherein said pins have axes wherein an angle formed by the pin axes and the radial plane equals 30° to 75°.

4. The screw extruder defined in claim 1 wherein said pins have recesses of a radius of curvature greater than a radius of said at least one screw.

5. The screw extruder defined in claim 4, further comprising means for mounting said pins for angular adjustment about respective pin axes through angles of up to 90°.

6. The screw extruder defined in claim 1 wherein said at least one core bead has a trapezoidal cross section.

7. The screw extruder defined in claim 1 wherein said pins have round cross sections.

8. The screw extruder defined in claim 1 wherein said pins are hollow and are traversed by a heat-exchange medium.

9. The screw extruder defined in claim 1 wherein said pins are spaced-apart by a distance corresponding at most to a diameter of the pins.

10. The screw extruder defined in claim 1 wherein said at least one core bead is provided with toothing.

11. The screw extruder defined in claim 10 wherein the depth of the toothing decreases in a direction in which said at least one screw conveys material.

12. The screw extruder defined in claim 1 wherein said pins are disposed in a plurality of radial plane areas following one another in a direction of flow through said extruder.

* * * * *